(12) United States Patent
Morrison et al.

(10) Patent No.: US 9,181,659 B2
(45) Date of Patent: Nov. 10, 2015

(54) COMPOSITIONS HAVING INCREASED CONCENTRATIONS OF CARBOXYMETHYLCELLULOSE

(71) Applicant: CP Kelco Oy, Aeaenekoski (FI)

(72) Inventors: Neil Argo Morrison, San Diego, CA (US); Anssi Kalevi Kamppinen, Palokka (FI); Andries Hanzen, Ede (NL); Marko Juhani Kanniainen, Aeaenekoski (FI); Anne Irmeli Rutanen, Tikkakoski (FI)

(73) Assignee: CP KELCO OY (FI)

(*) Notice: Subject to any disclaimer, the term of this patent is extended or adjusted under 35 U.S.C. 154(b) by 454 days.

(21) Appl. No.: 13/650,892

(22) Filed: Oct. 12, 2012

(65) Prior Publication Data

US 2013/0192492 A1    Aug. 1, 2013

Related U.S. Application Data

(60) Provisional application No. 61/632,421, filed on Oct. 17, 2011.

(51) Int. Cl.
| | |
|---|---|
| *D21H 19/52* | (2006.01) |
| *D21H 19/34* | (2006.01) |
| *C09D 101/28* | (2006.01) |
| *C08K 3/30* | (2006.01) |
| *C08K 3/22* | (2006.01) |
| *C08K 3/36* | (2006.01) |
| *C08J 3/05* | (2006.01) |
| *C08L 1/28* | (2006.01) |
| *C08B 11/12* | (2006.01) |
| *C08K 3/26* | (2006.01) |
| *D21J 1/08* | (2006.01) |

(52) U.S. Cl.
CPC ............... *D21H 19/52* (2013.01); *C08B 11/12* (2013.01); *C08J 3/05* (2013.01); *C08K 3/22* (2013.01); *C08K 3/26* (2013.01); *C08K 3/30* (2013.01); *C08K 3/36* (2013.01); *C08L 1/286* (2013.01); *C09D 101/286* (2013.01); *D21H 19/34* (2013.01); *D21J 1/08* (2013.01); *C08J 2301/26* (2013.01)

(58) Field of Classification Search
CPC ........ C08J 3/03; C08J 3/230128; C08K 3/26; C08K 3/36; C08K 3/30; C08K 3/262; C08K 3/22; C08K 2003/2206; C08L 1/286; C09D 101/286

See application file for complete search history.

(56) References Cited

U.S. PATENT DOCUMENTS

| 1,896,038 A | 1/1933 | Bradley et al. |
|---|---|---|
| 1,941,277 A | 12/1933 | Schorger |
| 2,087,237 A | 7/1937 | Bolton |
| 2,154,220 A | 4/1939 | Kurt |
| 2,190,445 A | 2/1940 | Haskins |
| 2,216,845 A | 10/1940 | Larson |
| 2,331,858 A | 10/1943 | Freeman |
| 2,689,184 A | 9/1954 | Grossi |
| 2,768,143 A | 10/1956 | Henry et al. |
| 2,775,970 A | 1/1957 | Schoenbaum |
| 3,068,120 A | 12/1962 | Albert |
| 4,225,636 A | 9/1980 | Cline |
| 4,288,245 A | 9/1981 | Roorda et al. |
| 4,883,536 A | 11/1989 | Burdick |
| 4,883,537 A * | 11/1989 | Burdick .................. 106/197.01 |
| 5,028,263 A | 7/1991 | Burdick |
| 5,080,717 A * | 1/1992 | Young ........................ 106/140.1 |
| 5,268,466 A * | 12/1993 | Burdick ........................ 536/114 |
| 5,354,424 A | 10/1994 | Rha et al. |
| 5,521,234 A | 5/1996 | Brown |
| 5,543,372 A | 8/1996 | Shi et al. |
| 5,722,433 A | 3/1998 | Ishino et al. |
| 5,785,747 A * | 7/1998 | Vollmer et al. ............ 106/194.2 |
| 5,830,548 A | 11/1998 | Andersen |
| 5,849,153 A | 12/1998 | Ishino et al. |
| 6,132,557 A | 10/2000 | Takeuchi |
| 6,547,927 B1 | 4/2003 | Takeuchi |
| 6,712,897 B2 * | 3/2004 | Ayambem et al. ......... 106/189.1 |
| 6,958,108 B1 | 10/2005 | Vuorinen |

(Continued)

FOREIGN PATENT DOCUMENTS

| CN | 1450125 A | 10/2003 |
|---|---|---|
| CN | 101210398 A | 7/2008 |
| CN | 101250020 A | 8/2008 |
| CN | 101879479 A | 11/2010 |
| EP | 0496269 A2 | 7/1992 |
| JP | 62132703 | 6/1987 |
| JP | 2002266285 A | 9/2002 |

OTHER PUBLICATIONS

Yang et al, "Viscosity properties of sodium carboxymethylcellulose solutions". Cellulose (2007) 14., pp. 409-417.*

(Continued)

*Primary Examiner* — David M Brunsman
(74) *Attorney, Agent, or Firm* — Sutherland, Asbill & Brennan LLP

(57) ABSTRACT

Embodiments of the present description provide methods for increasing the concentration of carboxymethylcellulose alkali solutions that are particularly suitable for use in a high solids paper coating, barrier materials, etc. Generally described, the method includes dissolving carboxymethylcellulose (CMC) and an alkali salt in water to obtain an alkali solution of CMC. The CMC desirably has a degree of substitution less than about 0.9. The alkali solution of CMC includes CMC in a concentration greater than about 9.8% by weight, has a pH from about 7.5 to about 11, and is characterized as having a viscosity of less than about 5,000 mPa.

20 Claims, 5 Drawing Sheets

(56) References Cited

U.S. PATENT DOCUMENTS

| | | | |
|---|---|---|---|
| 7,108,744 | B2 | 9/2006 | Podlas |
| 7,285,182 | B2 | 10/2007 | Mason |
| 7,371,279 | B2 | 5/2008 | Bayer |
| 7,531,600 | B1 | 5/2009 | Rey |
| 8,685,158 | B2 * | 4/2014 | Fabbris et al. ............ 106/804 |
| 2008/0031961 | A1 | 2/2008 | Cunningham et al. |

OTHER PUBLICATIONS

Anonymous "CMC Knowledge", http://www.lihong.net/en/RD/PACCMCknowledge/CMCknowledge/tabid/138/Default.aspx (2005).

International Search Report and Written Opinion for PCT/EP2012/070545 mailed (Feb. 20, 2013).

Aqualon Sodium Carboxymethylcellulose, Physical and Chemical Properties, Hercules Incorporated, (1998).

Seltzer, et al., Carboxymethylcellulose, Chapter 4, pp. 4-1-4-28, Handbook of Water Soluble Gums, McGraw-Hill, (1980).

Kastner et al., Structure and Solution Properties of Sodium Carboxymethylcellulose, Elsevier, Colloids and Surfaces 123-124 (1997), pp. 307-328.

Ghannam et al., Rheological Properties of Carboxymethyl Cellulose, University of Saskatchewan, (1996), pp. 289-301.

* cited by examiner

COMPOSITIONS HAVING INCREASED CONCENTRATIONS OF CARBOXYMETHYLCELLULOSE

CROSS-REFERENCE TO RELATED APPLICATIONS

This application claims priority to U.S. Application No. 61/632,421, filed Oct. 17, 2011, which is incorporated herein by reference.

FIELD OF THE INVENTION

The present application relates to compositions having increased concentrations of carboxymethylcellulose (CMC). Also, the present application relates to methods of increasing the concentration of CMC in low-viscosity compositions.

BACKGROUND

CMC is an anionic water-soluble polymer that is used in a variety of industrial and consumer applications. CMC generally is obtained from cellulose (e.g., from cotton linters, wood pulp, or other cellulosic sources) by substitution of at least a portion of the hydroxyl groups for carboxymethyl ether groups and may have a degree of substitution ("DS") of as high as 3.0, and a molecular weight ranging from about 30,000 to 1,000,000 Daltons.

Due to its ability to impart rheological properties, improve water retention, and improve the efficiency of optical brighteners, CMC is a popular additive in the paper and board industry, especially for coating, sizing, and base web manufacturing. In paper and board coating processes, CMC is added as a pre-dissolved solution (typically having 6 to 12 wt % CMC) into the coating makedown composition, which usually includes inorganic pigments, organic binders, and additives such as dispersants, optical brighteners, crosslinkers, lubricants, and dyes. The coating compositions usually have a solids content between 63 and 70 wt %, depending on the type of coating composition and the type of coating machinery being used; however, coating compositions having both higher and lower solids contents also are used in practice.

Not wishing to be bound by any theory, it is believed that coating compositions having high solids contents are preferable to improve quality and productivity, for example, by improving coating coverage and gloss while decreasing the amount of water that must be evaporated (i.e., thereby reducing drying energy) from coatings. When increasing the target solids content of the coating composition, higher solids contents also are required for the solutions of raw materials used to prepare the coating composition.

The existing solutions of pre-dissolved CMC having a low solids concentration generally will not enable formulation of a high solids content coating composition (e.g. such as 70 wt %), and typically limit the amount of CMC that can be used in the coating composition required for paper coating. Although dry addition of CMC to a high solids pigment slurry could resolve these issues, mills would need to have handling systems for powders, adequate manpower to add the powder by hand, or a mixing system capable of imparting sufficient shear to disperse the powder throughout the solution.

Alternatively, existing solutions of pre-dissolved CMC having a high solids concentration generally produce high-viscosity solutions (e.g., greater than 5000 mPas, measured on a Brookfield RV at 100 rpm and 50-60 degrees Celsius) that are difficult to process on traditional equipment, e.g., in pumping or screening processes.

CMC also can be used as, or to make, a surface treatment, such as a barrier material. Barrier materials containing CMC can be oil and grease resistant, oxygen resistant, or both. Common film coating technologies used to form barrier materials in the shape of a film include a size press, a metering size press, and various curtain coating technologies. For each of these technologies, solution up-take is an important parameter that depends, at least in part, on the viscosity and/or solids content of the polymer solution that is used. Not wishing to be bound by any theory, it is believed that uniform barrier materials, especially films, result from a high enough coat weight, good film hold-out, or both. These properties may be more easily obtained by making a barrier material with CMC solutions of higher concentration. Currently, a higher concentration of CMC in solution is frequently achieved by degrading the CMC using various enzyme technologies. The enzymes, however, typically decrease the molecular weight of the CMC so drastically that the resulting barrier materials do not have very good film hold-out and penetrate into a base web.

Solutions previously have been proposed to provide stable, concentrated, aqueous CMC suspensions. For example, U.S. Pat. No. 4,883,537 to Burdick describes aqueous CMC solutions having decreased viscosity that include at least 33 weight percent potassium carbonate. However, the high concentration of potassium carbonate required limits the usefulness of these solutions in applications and makes these compositions undesirable for high CMC solids content applications.

Thus, there remains a need to provide a method for preparing low-viscosity, high CMC solids compositions. More particularly, there remains a need to develop CMC products that can be used to prepare solutions having higher solids content than normal paper coating grades and maintaining traditional CMC coating benefits while providing greater flexibility to prepare higher solids coatings using existing CMC equipment and makedown procedures.

SUMMARY OF THE DESCRIPTION

Embodiments of the present description provide methods for increasing the concentration of CMC stock solution. In one aspect, the method comprises dissolving a CMC and an alkali salt in water to obtain an alkali solution of CMC and optionally modifying the pH of the alkali solution of CMC to a pH from about 7.5 to about 11. The CMC, in some embodiments, has a degree of substitution less than about 0.9. The CMC, in certain embodiments, has a molecular weight less than about 300 kD. The alkali solution of CMC comprises CMC in a concentration greater than about 9.8% by weight, has a pH of from about 7.5 to about 11, and has a viscosity of less than about 5,000 mPa.

In other aspects, the method for increasing the concentration of CMC stock solution comprises dry-blending CMC and an alkali salt to obtain a CMC mixture and dissolving the CMC mixture in water to obtain an alkali solution of CMC. The CMC, in some embodiments, has a degree of substitution less than about 0.9. The CMC, in certain embodiments, has a molecular weight less than about 300 kD. In embodiments, the alkali solution of CMC may comprise CMC in a concentration greater than about 9.8% by weight, has a pH from about 7.5 to about 11, and has a viscosity of less than about 5,000 mPa. The CMC mixture may comprise the alkali salt in a concentration greater than about 0.5% by weight of the CMC mixture.

In still another aspect, embodiments of the present description include a high solids paper coating composition comprising a pigment and an alkali solution of CMC. The alkali solution of CMC, in some embodiments, comprises CMC in a concentration greater than about 9.8% by weight and an alkali salt in a concentration of at least 0.05% by weight. The CMC, in some embodiments, has a degree of substitution less than about 0.9. The CMC, in certain embodiments, has a molecular weight less than about 300 kD.

In other aspects, embodiments of the present description include a CMC stock solution comprising an alkali solution of CMC comprising water, CMC in a concentration greater than about 9.8% by weight, an alkali salt in a concentration of at least about 0.05% by weight. The CMC, in some embodiments, has a degree of substitution less than about 0.9. The CMC, in certain embodiments, has a molecular weight less than about 300 kD. The alkali solution of CMC, in embodiments, has a pH from about 7.5 to about 11, and has a viscosity of less than about 5,000 mPa.

Additional aspects will be set forth in part in the description which follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

DETAILED DESCRIPTION

Figure 1:
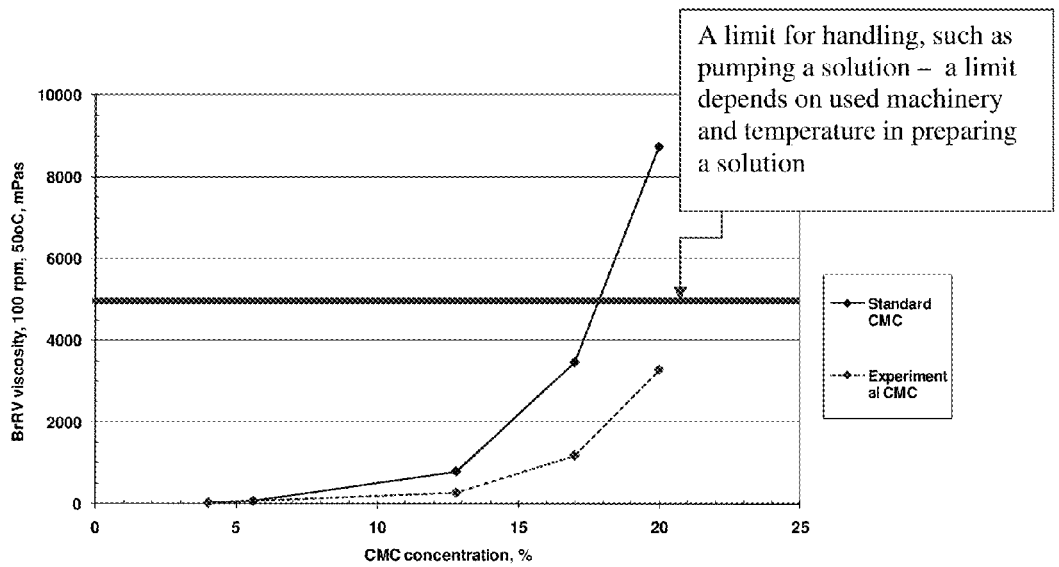
FIG. 1 is a graph illustrating the viscosity of CMC solutions as a function of CMC concentration. Standard CMC: FF-5 (4% viscosity of 27 mPas, DS 0.7). Experimental CMC: FF-5 (98 wt %+2 wt % $Na_2CO_3$). Viscosity measurement: Brookfield RV 100 rpm, 50° C. CMC and dry-blend of CMC+$Na_2CO_3$ were mixed with water using a wire-mixer for 90 minutes before measuring the viscosity.

Embodiments of the present description address the above-described needs by providing methods for increasing the concentration of CMC stock solutions. In particular, the high concentration CMC stock solutions are suitable for use in high solids paper coatings. The CMC stock solutions also can be used as or in surface treatment materials, such as barrier materials.

In embodiments, the methods generally comprise dry-blending CMC and alkali salt to obtain a CMC mixture and dissolving the CMC mixture in water to obtain an alkali solution of CMC comprising CMC in a concentration greater than about 9.8% by weight and an alkali salt in a concentration of at least about 0.05% by weight. In other embodiments, the alkali salt may be added either before or after dissolving the CMC in water to obtain the alkali solution of CMC. The CMC desirably has a degree of substitution less than about 0.9 and a molecular weight less than about 300 kD. Surprisingly, by preparing solutions containing the CMC and alkali salt, stock solutions having high concentrations of CMC can be attained having a viscosity of less than about 5,000 mPa at a range of temperatures, depending on the concentration of the solution. For example, a stock solution having a high concentration of CMC can be attained having a viscosity of less than about 5,000 mPa in the range of about 50 to about 60 degrees Celsius. The concentration that can be reached can depend on the molecular weight of the CMC. Not wishing to be bound by any theory, in certain situations in which a CMC having a lower molecular weight normally is limited to a concentration of less than 9.8% by weight due to the viscosity of the solution (i.e., a viscosity of greater than 5,000 mPa), the use of alkali solutions of CMC in accordance with embodiments provided herein significantly decreases the viscosity of the solution as compared to solutions of CMC without the alkali salt, thereby allowing for use of higher concentrations of the CMC.

In embodiments, the method further comprises modifying the pH of the alkali solution of CMC to a pH from about 7.5 to about 11. In other embodiments the alkali solution of CMC has a pH from about 7.5 to about 10.5. For example, in particular embodiments the alkali solution of CMC has a pH of greater than about 8.0, greater than about 8.5, or greater than about 9.0. (See e.g., FIG. 3). Suitable methods for modifying the pH of the alkali solution of CMC are known to those skilled in the art.

In certain embodiments, the CMC has a degree of substitution from about 0.4 to about 0.9 and a molecular weight less than about 300 kD. In embodiments, the CMC has a degree of substitution from about 0.4 to about 0.9, from about 0.6 to about 0.9, or from about 0.7 to about 0.85. In embodiments, the CMC has a molecular weight less than about 300 kD, less than about 200 kD, less than about 150 kD, or less than about 100 kD.

The CMC used in embodiments of the present description also may be characterized by its viscosity and pH. For example, in certain embodiments, the CMC has a viscosity of less than about 2000 mPas for a 2% solution of the CMC at a temperature of about 25° C., a viscosity of less than about 400 mPas for a 2% solution of the CMC at a temperature of about 25° C., or a viscosity of less than about 100 mPas for a 2% solution of the CMC at a temperature of about 25° C. In embodiments, the CMC is further characterized as having a pH of less than about 8 for a 1% solution of the CMC. In other embodiments, the CMC is further characterized as having a pH of less than about 9 for a 1% solution of the CMC.

In embodiments, the CMC desirably is present in the alkali solution in an amount sufficient to provide a concentration of greater than about 9.8% up to about 25%, a concentration of greater than about 10% up to about 25%, a concentration of greater than about 12% up to about 25%, a concentration of greater than about 15% up to about 25%, a concentration of greater than about 18% up to about 25%, or a concentration of greater than about 20% up to about 25%.

The alkali salt used in embodiments of the present description desirably comprises a base salt. Non-limiting examples of base salts include sodium carbonate, sodium bicarbonate, sodium sulfite, sodium hydroxide, sodium silicate, potassium hydroxide, potassium carbonate, potassium bicarbonate, calcium hydroxide, and combinations thereof. In embodiments, the alkali salt is present in the alkali solution of CMC in an amount of at least about 0.05%. For example, in certain embodiments the alkali salt is present in the alkali solution of CMC in an amount from about 0.05% to about 5.0% by weight, from about 0.05% to about 2.5% by weight, from about 0.05% to about 1.0% by weight, from about 0.1% to about 1.5%, from about 0.1% to about 1.0% by weight, from about 0.1% to about 0.5% by weight, from about 0.2% to about 1.0% by weight, or from about 0.2% to about 0.7% by weight.

In particular embodiments, the CMC stock solutions provided herein comprise an alkali salt at a concentration from about 0.1% to about 2.0%, and CMC at a concentration greater than about 9.8% up to about 20%. In other embodiments, the CMC stock solutions provided herein comprise an alkali salt at a concentration from about 0.1% to about 1.5%, and CMC at a concentration greater than about 12% up to about 20%

In particular embodiments, the alkali salt comprises a mixture of alkali salts, for example, sodium carbonate and either sodium sulfite, sodium bicarbonate, or a combination thereof. Desirably, the sodium sulfite, sodium bicarbonate, or combination thereof, is present in the alkali solution of CMC in a concentration from about 0.1% to about 2% by weight while the total concentration of the alkali salts is less than about 5% by weight.

Also provided in embodiments herein are high solids paper coating compositions comprising an alkali solution of CMC, a pigment (e.g., inorganic pigments, such as calcium carbonate), and other additives known to those skilled in the art (e.g., organic binders, such as latex). Typically, the alkali solutions of CMC comprise less than 0.5% by weight of the pigments for a coating composition having a solids content of greater than about 70% by weight. The alkali solution of CMC comprises CMC in a concentration greater than about 9.8% by weight and alkali salt in a concentration of at least about 0.05% by weight, wherein the CMC has a degree of substitution less than about 0.9 and a molecular weight less than about 300 kD.

Also provided in embodiments herein are surface treatment materials, such as barrier materials, made from or containing CMC. Barrier materials made from or containing CMC can be used in combination with a matrix material, such as paper, board, etc., or can be stand-alone materials. The barrier materials can be made into any size or shape, using any technique known in the art. In embodiments, the barrier material containing CMC is a film. In some embodiments, the films are formed generally by employing an alkali solution of CMC and removing the solvent, such as by evaporation or heat-assisted evaporation.

The barrier materials made from or containing CMC can be resistant to a variety of materials. For example, the barrier materials can be oil or grease resistant, oxygen resistant, or both, which are features that typically depend on a barrier material's pore size, defects, such as pin-holes, or both. The barrier properties of a barrier material also may depend on coat weight, film hold-out (if the material is a film), or both.

A high coat weight can be obtained, in some circumstances, by using a CMC solution that has a relatively high concentration, and the film hold-out can be improved by using CMC with high molecular weight. These considerations can be balanced to produce a desirable barrier material, because a lower coat weight is acceptable, in some circumstances, if a CMC of higher molecular weight is used. In addition to improving coat weight, making a barrier material film from a CMC solution with a relatively high concentration can improve film hold-out because the wet film will enjoy faster immobilization. Generally, the alkali solutions of CMC described herein can be used to optimize these factors, including the molecular weight of CMC and the concentration of the CMC solution.

Embodiments of the present description allow for use of greater concentrations of CMC and solids without significantly increasing the viscosity or otherwise negatively affecting the functionality of the CMC. Desirably, the alkali solutions of CMC provided herein are characterized as having a viscosity that is substantially reduced as compared to a comparable solution of CMC without alkali salts. For example, in embodiments the viscosity of the alkali solution of CMC comprising an alkali salt is less than about 50% that of a comparable solution of CMC without the alkali salt. In still other embodiments, the viscosity of the alkali solution of CMC comprising an alkali salt is from about 20% to about 50% that of a comparable solution of CMC without the alkali salt.

For example, in certain embodiments the addition of an alkali salt increases the maximum concentration of CMC in an alkali solution of CMC from an upper limit of 12-15% CMC to an upper limit of 18-20%, or from an upper limit of about 10% to about 13-15%, or from an upper limit of 8% to about 9.8-12%.

The present invention is further illustrated by the following examples, which are not to be construed in any way as imparting limitations upon the scope thereof. On the contrary, it is to be clearly understood that resort may be had to various other embodiments, modifications, and equivalents thereof which, after reading the description therein, may suggest themselves to those skilled in the art without departing from the scope of the appended claims.

EXAMPLES

Example 1

Viscosity of Standard and Experimental Solutions at Varying CMC Concentrations

CMC solutions were prepared using FF-5 (4% viscosity of 27 mPas (Brookfield LV 60 rpm, 25° C.), MW 50 kD, DS 0.7) grade CMC at four CMC concentrations: approximately 5, 13, 17, and 20 percent CMC. 2% $Na_2CO_3$ was pre-blended with the CMC to produce the "experimental" solutions. The viscosity of each solution was measured and the results can be seen in FIG. 1. Viscosity measurement: Brookfield RV 100 rpm, 50° C. CMC and dry-blend of CMC+salt were mixed with water using a wire-mixer for 90 minutes before measuring the viscosity.

FIG. 1 shows a decrease in solution viscosity for the Experimental solutions as compared to the Standard solutions with identical CMC concentration. At the highest CMC concentration, 20%, the standard solution had a viscosity of near 9000 mPas while the Experimental solution containing the $Na_2CO_3$ had a viscosity of near 3500 mPas. These results demonstrated the ability to achieve highly concentrated CMC solutions having a viscosity of no more than 5000 mPas, the handling limit for these solutions. However, the handling limit depends on the machinery used and temperature.

Example 2

Effect of Various Salts on Viscosity of CMC Solutions

Various concentrations of alkali salts and NaCl were added to CMC solutions at 20% CMC concentration to produce CMC solutions as shown in Table 1. Reference CMC: FF-5 (4% viscosity of 27 mPas, DS 0.7). Viscosity measurement: Brookfield RV 100 rpm, 60° C. CMC and dry-blend of CMC+salt were mixed with a wire-mixer to water for 90 minutes before measuring the viscosity. Viscosity measurements were performed on the solutions, the results of which are shown in Table 1 and FIG. 2.

TABLE 1

Viscosity of CMC Solutions with Various Salt Concentrations

| | Viscosity of 20% CMC concentration | pH |
|---|---|---|
| Reference: FF-5 | 8390 | 5.6 |
| FF-5 + 2% Na2CO3 | 2220 | 9.3 |
| FF-5 + 2% NaHCO3 | 4750 | 7.5 |
| FF-5 + 4% Na-silicate | 2970 | 7.9 |
| FF-5 + 1% NaCl | 11160 | 5.6 |
| FF-5 + 3% NaCl | 12200 | 5.6 |
| FF-5 + 5% NaCl | 12700 | 5.5 |

Figure 2A:
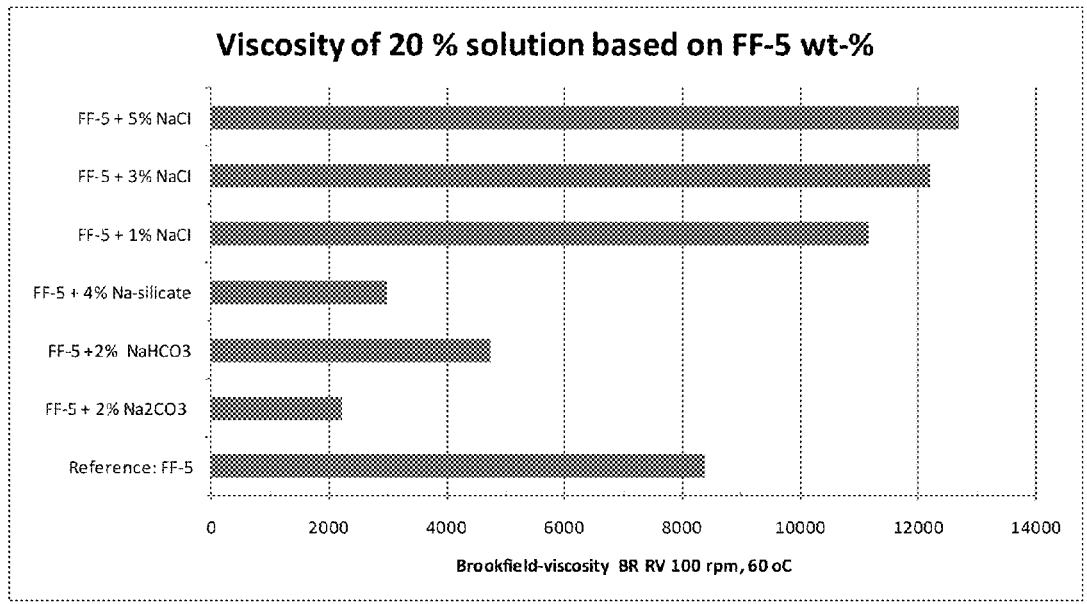
FIG. 2A is a graph comparing the effect of various salts on CMC solution viscosity. Standard CMC: FF-5 (4% viscosity of 27 mPas, DS 0.7). Viscosity measurement: Brookfield RV 100 rpm, 60° C. CMC and dry-blend of CMC+salt were mixed with water using a wire-mixer for 90 minutes before measuring the viscosity.
Figure 2B:
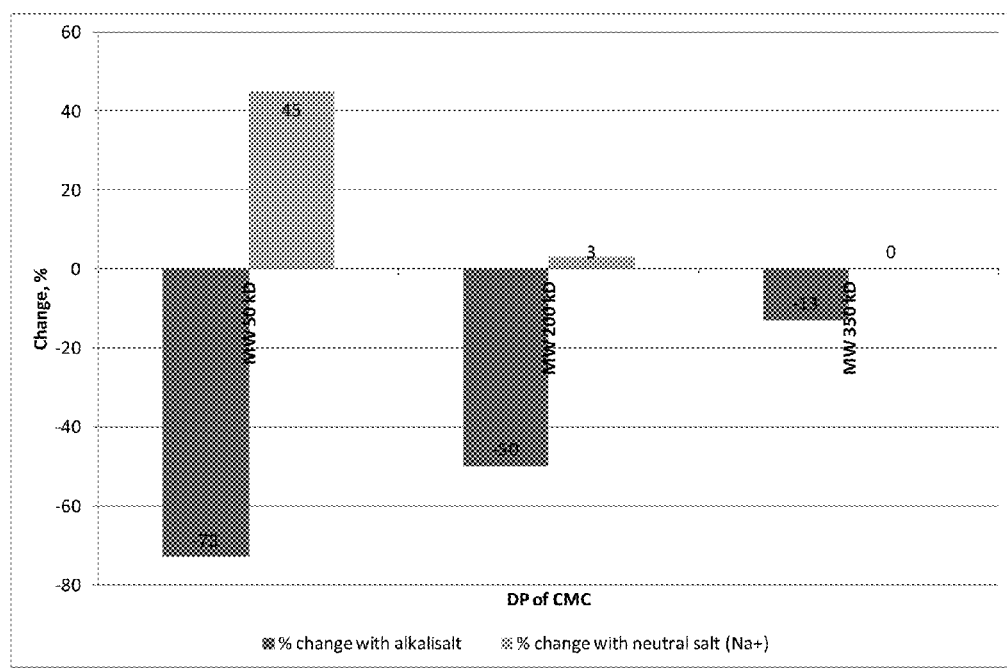
FIG. 2B is a graph comparing the effect of sodium carbonate and sodium chloride on CMC solution viscosity for CMC having a DS of 0.7 but a variable molecular weight. Viscosity Measurement Brookfield RV 100 rpm, 50° C.

As illustrated in FIG. 2A, the solution viscosity increased with increasing NaCl concentration. The addition of alkali salt resulted in a decrease in solution viscosity, as compared to the solution without salt and as compared to the solution with NaCl. For example, as illustrated in FIG. 2B (showing the effects of a neutral salt and alkali salt on CMC having a DS of 0.7 and a molecular weight of 50 kD, 200 kD, or 350 kD), neutral salt (NaCl) addition typically increased solution viscosity of CMC having a lower molecular weight (i.e., 50 kD and 200 kD). Whereas, alkali salt ($Na_2CO_3$) addition more significantly decreased solution viscosity of CMC at a lower molecular weight.

Example 3

Viscosity and pH Change of CMC Solutions Upon the Addition of Alkali Salt

CMC solutions were prepared using various grades of CMC described in Table 2 below both with and without an alkali salt. The CMC and dry-blend of CMC+alkali salt (2% sodium carbonate) were mixed with a wire-mixer in water for 90 minutes before measuring the pH and the viscosity.

TABLE 2

Viscosity and pH Change of CMC Solutions with addition of 2% Alkali Salt

| CMC grades | Purity NaCMC, % | DS | Molecular weight, kD | Viscosity Brookfield LV 60 rpm 25° C., mPas | pH 1% solution | Concentration, % | Viscosity Brookfield RV 100 rpm, 60° C. REF/EXP, mPas | Viscosity change with alkaline salt, % | pH 1% solution with alkaline |
|---|---|---|---|---|---|---|---|---|---|
| FF-5 | 98.8 | 0.71 | 50 | 4%) 35 | 5.6 | 20 | 8390/2220 | 75 | 9.2 |
| FF-10 | 98.2 | 0.72 | 80 | 4%) 131 | 6.5 | 12 | 4730/1210 | 74 | 9.2 |
| FF-10 | 98.2 | 0.8 | 80 | 4%) 131 | 6.6 | 12 | 4100/1070 | 74 | 9.6 |
| FF-30 | 99.1 | 0.73 | 110 | 4%) 440 | 6.9 | 8 | 2490/675 | 73 | 10 |
| FF-700 | 98.2 | 0.72 | 180 | 2%) 410 | 6.5 | 5 | 4300/2120 | 51 | 10.4 |
| FF-700 | 98.4 | 0.78 | 250 | 2%) 820 | 6.4 | 5 | 7560/4850 | 36 | 10.4 |
| FF-2000 | 98.2 | 0.73 | 380 | 2%) 2000 | 6.8 | 3 | 2840/2340 | 18 | 10.4 |
| Cekol 150 | 99.9 | 0.78 | 150 | 4%) 2650 | 6.2 | 7 | 5990/5130 | 14 | 10.3 |
| FF-LC | 63.5 | 0.95 | 100 | 6%) 325 | 10.4 | 6 | 325/325 | 0 | 10.9 |
| FF-LC washed | 98.6 | 0.95 | 100 | 6%) 1440 | 10.9 | 6 | 1440/1480 | 0 | 10.3 |

Generally, Table 2 shows that the solutions containing lower molecular weight CMC (i.e., in the present example less than 200 kD) displayed the largest decreases in viscosity as compared to similar solutions not containing a salt. Further, at lower molecular weight CMC grades, the pH of the alkaline solution is significantly higher than that of the solution not containing a salt.

Figure 3:
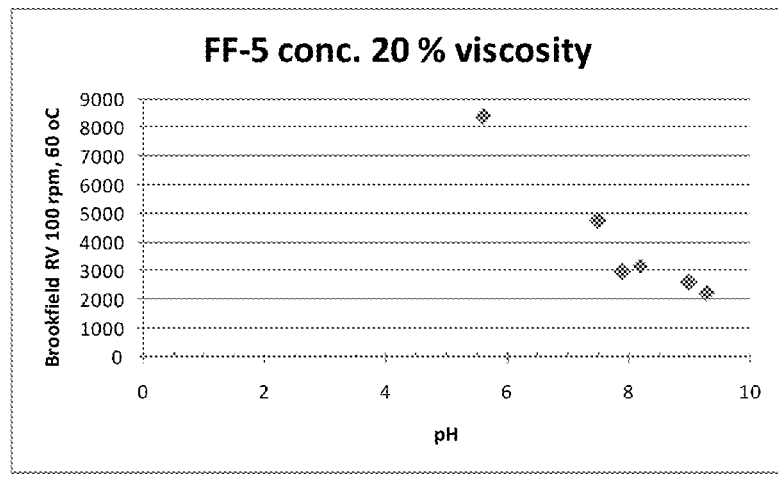
FIG. 3 is a graph illustrating the effect of pH on a 20 wt % CMC solution's viscosity. Standard CMC: FF-5 (4% viscosity of 27 mPas, DS 0.7). Experimental CMC: FF-5 (96-98 wt %+2-4% of various alkali salts). Viscosity measurement: Brookfield RV 100 rpm, 60° C. CMC and dry-blend of CMC+various alkali salts were mixed with water using a wire-mixer for 90 minutes before measuring the viscosity.

The effects of pH on the viscosity of CMC solutions was further characterized by measuring the viscosity of a solution of CMC (FF-5, 20 wt % CMC) both with and without alkali salts. The viscosity was measured using a Brookfield RV at 100 rpm and 60° C. after mixing the dry-blend with water for 90 minutes. The results are illustrated in FIG. 3, which shows that as the pH increased with the addition of alkali salts, the viscosity of the CMC solution decreased. The data point representing the sample having a pH of 6 and a viscosity of 8500 did not include an alkali salt; the remaining samples included an alkali salt. The data points near a pH of 8 were two collected from two different solutions to demonstrate repeatability.

Example 4

Application Tests

Application tests were performed with a target coating color formulation having 100 pph (parts per hundred) $CaCO_3$, 10 pph SB-latex, 0.15 pph CMC and, 0.3 pph optical brightener. The coating color formulation solids content was 70 wt % and the pH was adjusted to 8.5 by addition of sodium hydroxide. The CMC was added as a pre-dissolved 20% solution of CMC FF-5 both with and without $Na_2CO_3$ (1 or 2% $Na_2CO_3$). The coating color rheology, water retention, and optical properties of coated papers were characterized for these samples and are illustrated in FIGS. 4-7.

The rheology of coating color formulation was evaluated using a Brookfield RV at 100 rpm, a Hercules HI-shear viscometer DV-10 (shear rate 100000 l/s), and an ACAV A2-capillary viscometer (shear rate 1000000 l/s). Static water retention (AA-GWR) was measured using a constant volume of 10 mL of the coating color formulation (membrane pore size of 5 μm, 30 kPa pressure, 2 minutes).

The paper coating was carried out with a laboratory coater (DT Paper Science) at a speed 70 m/min. The coating color formulation was applied to a paper web by the roll applicator and the excess was metered away by a stiff blade. The base web was a pre-coated fine paper (grammage 100 g/m$^2$) and the coat weight of the tests was 8-9 g/m$^2$.

Figure 4:
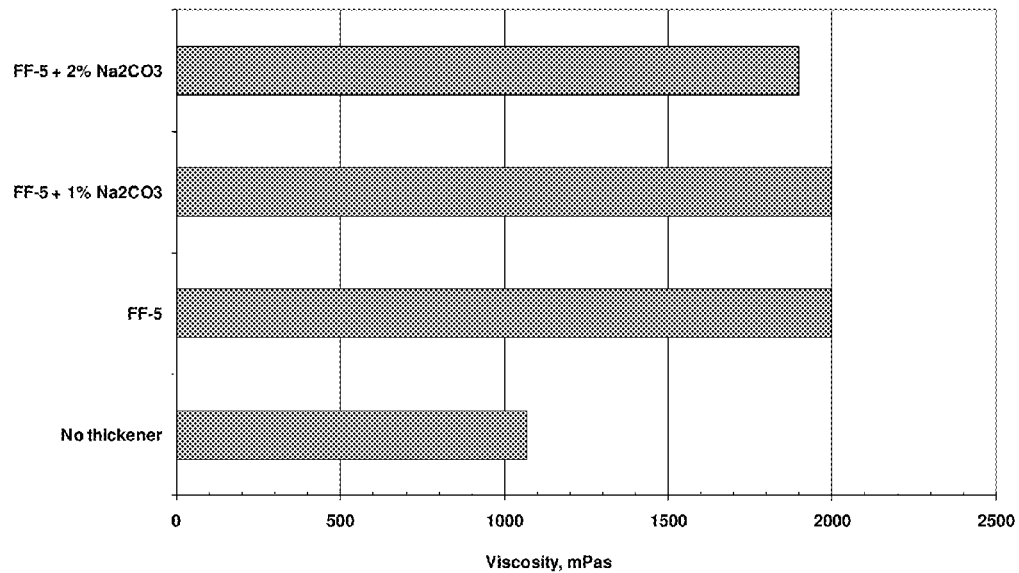
FIGS. 4 and 5 are graphs illustrating the effect of composition and shear rate on the viscosity of various CMC coating colors.
Figure 5:
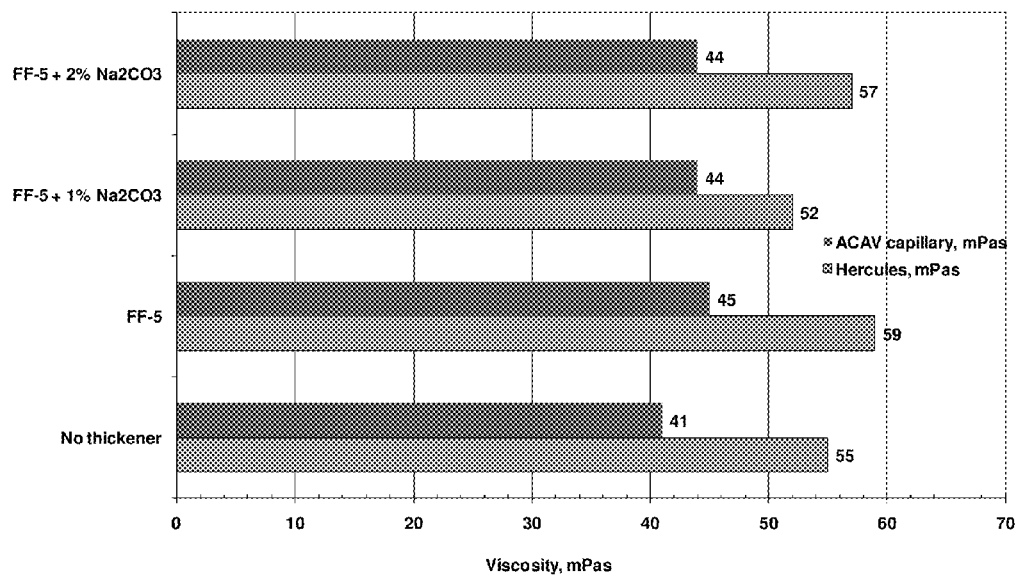

The viscosity measurements were taken at different shear rates, the results of which are illustrated in FIGS. 4 and 5. There was no significant difference in the viscosity at different shear rates for the CMC containing coating color formulations with or without the sodium carbonate.

Figure 6:
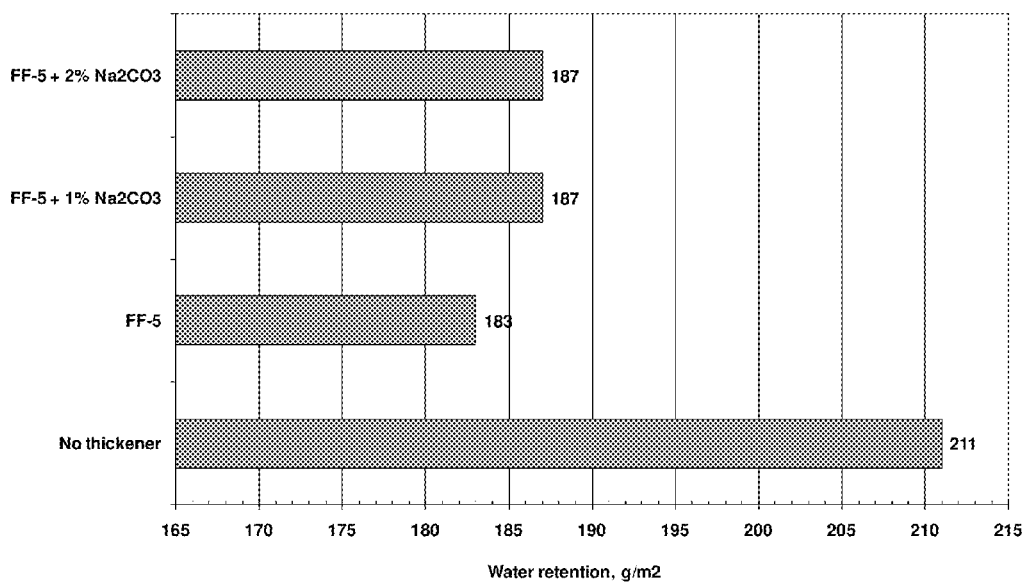
FIG. 6 is a graph illustrating the water retention properties of various coating colors.
Figure 7:
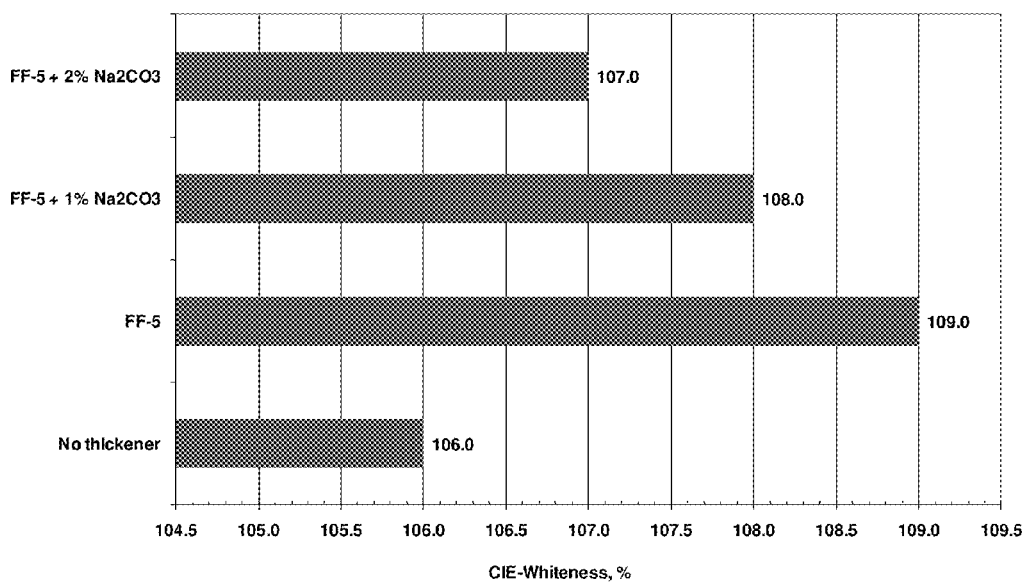
FIG. 7 is a graph illustrating the optical properties of various coated papers with coating colors.

The water retention properties are illustrated in FIG. 6. There was no significant difference in water retention properties for the CMC containing coating color formulations with or without the sodium carbonate. In addition, as illustrated in FIG. 7, the use of sodium carbonate did not significantly decrease the whiteness value of the coated paper.

Example 5

Barrier Materials Made from or Containing CMC

Four barrier materials containing CMC were made and evaluated using a KIT test to determine their oil resistance. The oil resistance is better for those barrier materials with higher KIT test scores.

The barrier materials were prepared by forming predissolved solutions of CMC, with and without alkali salts, having different concentrations. The predissolved solutions were applied by hand-rods on a surface sized 80 g/m$^2$ paper. The materials were dried with an air dryer. The four barrier materials containing CMC and their characteristics are listed in the following table:

TABLE 3

Characteristics of Barrier Materials

| Material No. | CMC MW | Alkali Salt | Concentration of CMC or CMC/alkali salt solutions (wt. %) |
|---|---|---|---|
| 1 | Low (30 kD) | No | 17.5 |
| 2 | Low (30 kD) | Yes (NaHCO$_3$ + Na$_2$CO$_3$) | 21 (20.37% CMC; 0.42% NaHCO$_3$; 0.21% Na$_2$CO$_3$) |
| 3 | High (180 kD) | No | 4.5 |
| 4 | High (180 kD) | No | 7 |

Figure 8:
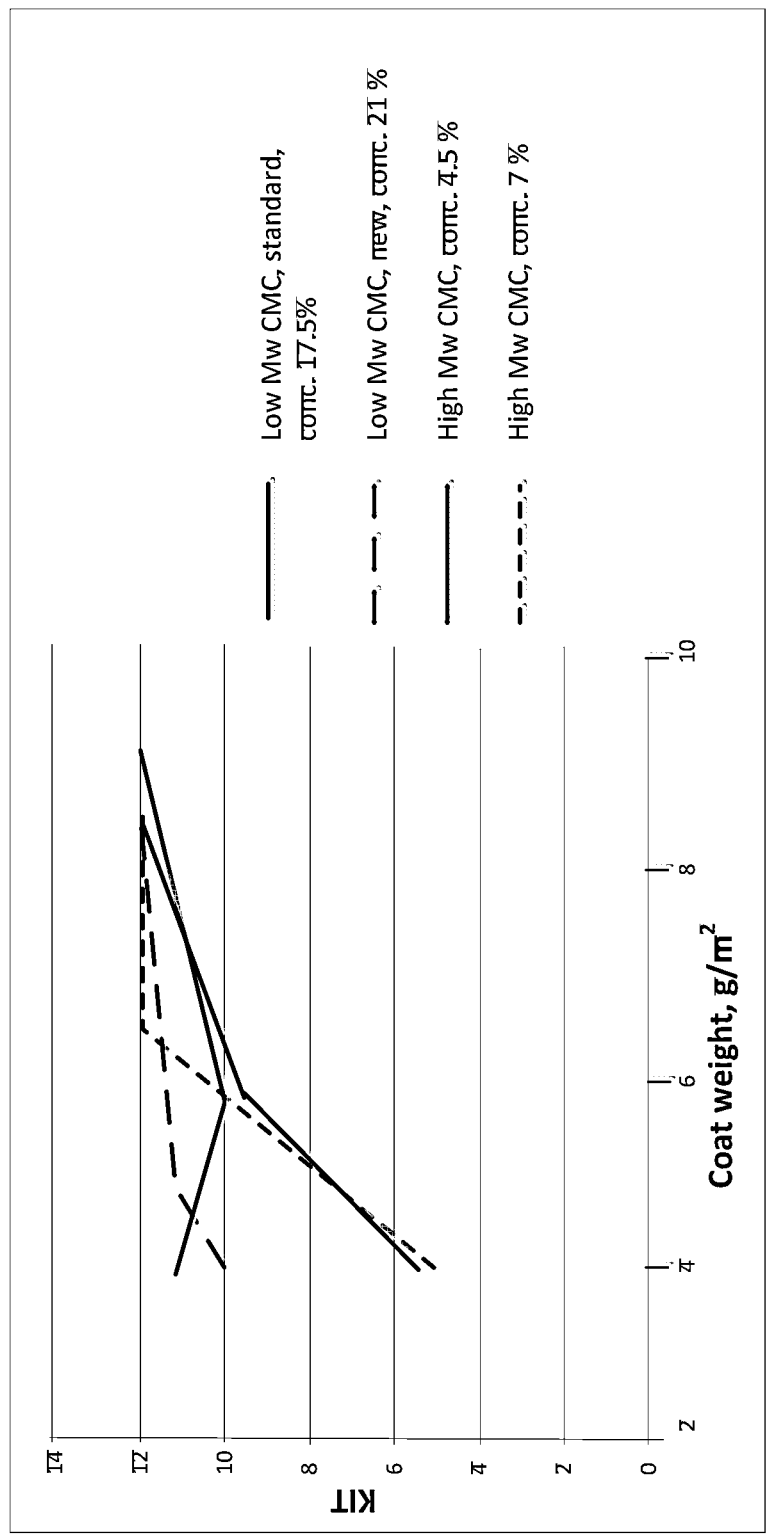
FIG. 8 is a graph depicting the oil-resistance of four barrier materials containing CMC over a range of coat weights.

The performance of materials 1-4 is shown in FIG. 8, which depicts the KIT values of the four materials over a range of coat weights. The data in FIG. 8 indicated that the embodiments described herein provide the possibility of using CMC solutions having a wider range of concentrations to make barrier materials. Moreover, barrier material number 2 in this example, which was made with a CMC solution of relatively high concentration, had better film hold-out than the other samples, and required less drying time.

While the invention has been described in detail with respect to specific embodiments thereof, it will be appreciated that those skilled in the art, upon attaining an understanding of the foregoing, may readily conceive of alterations to, variations of and equivalents to these embodiments. Accordingly, the scope of the present application should be assessed as that of the appended claims and any equivalents thereof.

The invention claimed is:

1. A method for increasing the concentration of a CMC stock solution comprising:
   dissolving a CMC mixture in water to obtain an alkali solution of CMC, the CMC mixture comprising a dry-blend of a CMC, having a degree of substitution of less than about 0.9, and an alkali salt,
   wherein the alkali solution of CMC comprises the CMC in a concentration greater than about 9.8% by weight, and has a pH from about 7.5 to about 11, and
   wherein the alkali solution of CMC has a viscosity of less than about 5,000 mPa when measured at a temperature from about 50° C. to about 60° C.

2. The method of claim 1, wherein the CMC has a molecular weight of less than about 300 kD.

3. The method of claim 1, wherein the CMC has a molecular weight of less than about 150 kD.

4. The method of claim 1, wherein the CMC has a pH of less than about 9 for a 1% solution of the CMC.

5. The method of claim 1, wherein the CMC has a pH of less than about 8 for a 1% solution of the CMC.

6. The method of claim 1, wherein the alkali solution of CMC comprises the CMC in a concentration greater than about 9.8% up to about 25% by weight.

7. The method of claim 1, wherein the alkali solution of CMC comprises the CMC in a concentration greater than about 10% up to about 25% by weight.

8. The method of claim 1, wherein the alkali solution of CMC comprises the CMC in a concentration greater than about 12% up to about 25% by weight.

9. The method of claim 1, wherein the alkali solution of CMC comprises the CMC in a concentration greater than about 15% up to about 25% by weight.

10. The method of claim 1, wherein the alkali solution of CMC comprises the CMC in a concentration greater than about 18% up to about 25% by weight.

11. The method of claim 1, wherein the alkali solution of CMC comprises the CMC in a concentration greater than about 20% up to about 25% by weight.

12. The method of claim 1, wherein the alkali salt is selected from the group consisting of sodium carbonate, sodium bicarbonate, sodium sulfite, sodium hydroxide, sodium silicate, potassium hydroxide, potassium carbonate, potassium bicarbonate, calcium hydroxide, and combinations thereof.

13. The method of claim 1, wherein the alkali solution of CMC comprises the alkali salt in a concentration of at least 0.05% by weight.

14. The method of claim 1, wherein the alkali salt comprises sodium carbonate, and the alkali solution of CMC comprises sodium carbonate in a concentration from about 0.1% to about 1.0% by weight.

15. The method of claim 14, wherein the alkali salt further comprises sodium sulfite, sodium bicarbonate, or a combination thereof, and wherein sodium sulfite, sodium bicarbonate, or a combination thereof is present in the alkali solution of CMC in a concentration from about 0.1% to about 2% by weight.

16. The method of claim 1, wherein the alkali solution of CMC has a pH of from about 7.5 to about 10.5.

17. The method of claim 1, wherein the alkali solution of CMC has a viscosity that is substantially reduced as compared to a comparable solution of CMC without the alkali salt.

18. The method of claim 1, wherein the viscosity of the alkali solution of CMC comprising the alkali salt is less than about 50% of the viscosity of a comparable solution of CMC without the alkali salt.

19. The method of claim 1, wherein the viscosity of the alkali solution of CMC comprising the alkali salt is from about 20% to about 50% of the viscosity of a comparable solution of CMC without the alkali salt.

20. The method of claim 1, further comprising modifying the pH of the alkali solution of CMC to a pH from about 7.5 to about 11.

* * * * *